United States Patent [19]

Overton

[11] 3,912,345
[45] Oct. 14, 1975

[54] BEARING CHOCKING ASSEMBLY FOR MILL ROLLS

[75] Inventor: Harold C. Overton, Gadsden, Ala.

[73] Assignee: Republic Steel Corporation, Cleveland, Ohio

[22] Filed: Aug. 31, 1973

[21] Appl. No.: 393,507

[52] U.S. Cl............................ 308/207 R; 29/148.4
[51] Int. Cl.² ........................................ F16C 35/06
[58] Field of Search.... 308/207 R, 213, 234, 189 R, 308/236; 29/84, 148.4

[56] References Cited
UNITED STATES PATENTS

| | | | |
|---|---|---|---|
| 3,080,199 | 3/1963 | Rickley | 308/207 R |
| 3,361,498 | 1/1968 | Cook | 308/207 R X |
| 3,516,352 | 6/1970 | Lewis | 308/207 X |
| 3,733,108 | 5/1973 | Petros et al. | 308/236 |
| 3,799,636 | 3/1974 | Kersting | 308/207 |

Primary Examiner—M. Henson Wood, Jr.
Assistant Examiner—Gene A. Church
Attorney, Agent, or Firm—Watts, Hoffmann, Fisher & Heinke Co.

[57] ABSTRACT

A bearing chocking assembly for mill rolls includes an axially immovable segmented inner ring engageable with a formation such as a shoulder in an annular groove formed on a mill roll neck, and an axially movable outer ring engageable with a bearing retainer for axially positioning the bearing retainer to "chock" or axially position bearings which journal the roll neck. Cooperating wedge-shaped cam surfaces on the inner and outer rings effect axial movement of the outer ring when the outer ring is rotated relative to the inner ring. The inner ring is keyed to the roll neck to prevent relative rotation therebetween. The outer ring is bolted to the inner ring once it has been positioned to properly chock the roll bearings.

21 Claims, 23 Drawing Figures

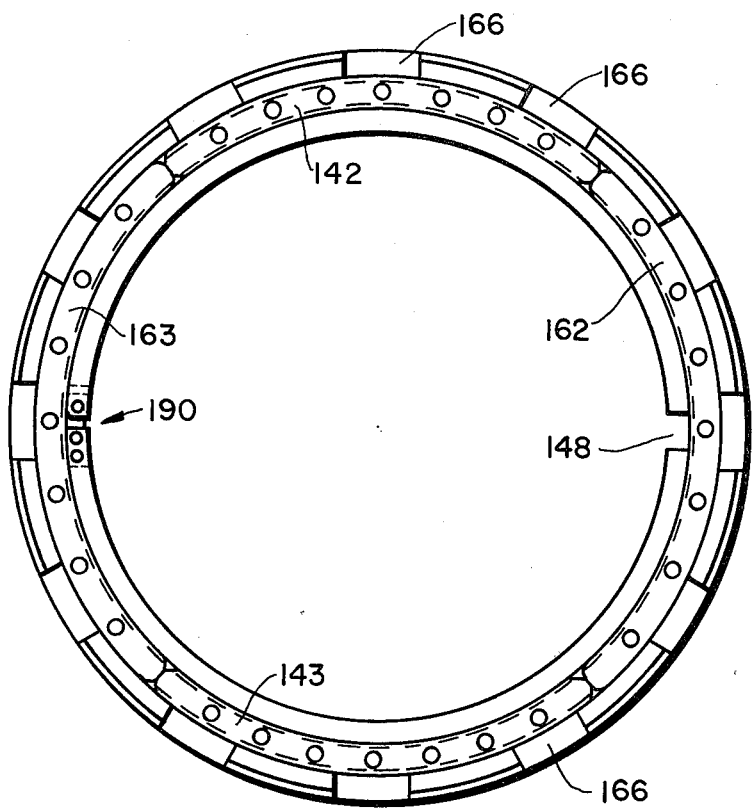
Fig. 17
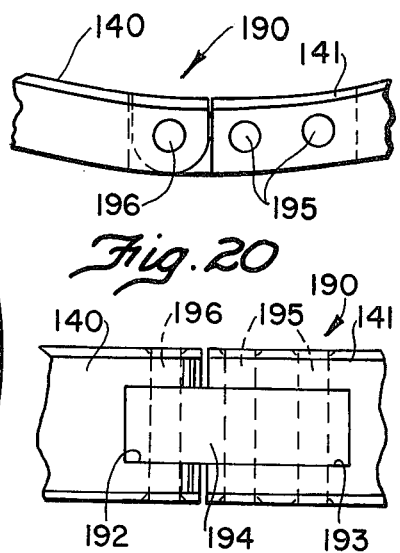
Fig. 20
Fig. 21
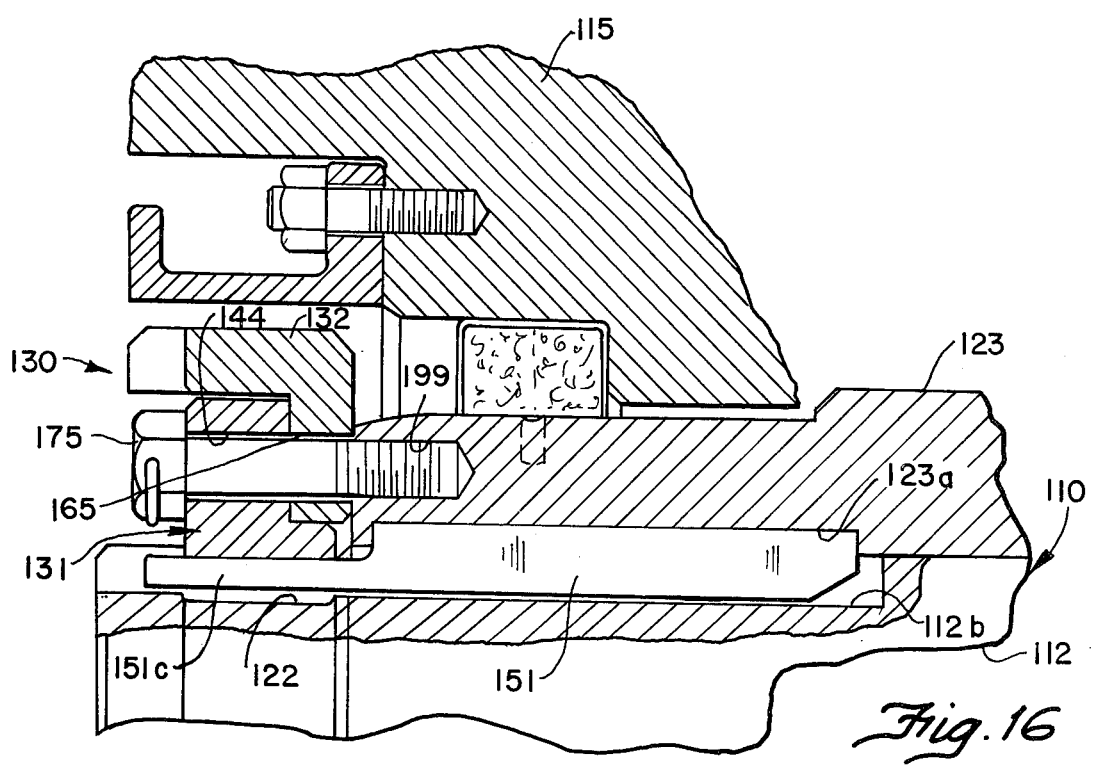
Fig. 16

BEARING CHOCKING ASSEMBLY FOR MILL ROLLS

BACKGROUND OF THE INVENTION

1. Field of the Invention

The present invention relates to a novel and improved assembly for axially positioning or chocking mill roll bearing and the like where such bearings of the rolls must frequently be chocked, adjusted and unchocked to permit roll replacement and to assure maximum roll operating life.

2. Prior Art

Rolling mills include an array of parallel extending rolls which exert compressive rolling forces on metal feed stock, typically forming it into thinner elongated strip or plate configurations. The mill rolls have reduced diameter end regions called "roll necks" which are journaled for rotation by roller bearings supported in a mill stand. Adjustable bearing chocking devices hold the roller bearings in place and provide a means for axially adjusting bearing play.

The mill rolls, particularly the primary work rolls, must frequently be removed and reground. In some present day cold rolling mills, the work rolls have a useful life of only about 4 to 8 hours. In order to minimize mill down-time during roll replacement, it is desirable to provide a bearing chocking device which is easily installed, removed, and adjusted to effect proper chocking of the roller bearings. It is also desirable to provide a bearing chocking device which, for purposes of safety, minimizes the possibility of its becoming disengaged or loosening its pre-adjusted chocking position during operation.

Most known bearing chocking devices for mill rolls have included three annular components: a locking collar assembly which mounts in an annular groove on a roll neck, and a pair of rings threaded together to provide an annular assembly of adjustable length. The assembly of threaded rings is positioned between the locking collar and the bearing to be chocked, whereafter the rings are rotated to extend the length of the assembly until the bearing is properly chocked.

Known locking collar assemblies are either relatively complex, requiring substantial amounts of time to install and remove, or are relatively insecure and present safety concerns. One recently proposed locking collar provides two semi-annular members hinged together by a single hinge pin at one end and releasably coupled by a single threaded fastener at the other end. If either the hinge pin or the threaded fastener should fail, the collar drops off the mill neck.

Known threaded ring assemblies are expensive-to-machine structures that are not easily installed, removed and adjusted. Recent proposals to improve the configuration of these assemblies have called for additional modification of other surrounding structures such as the bearing retaining rings. Some proposals even require modification of the roll neck configuration. These modifications are expensive to effect and result in specially configured parts that cannot be used with standard bearing chocking devices.

SUMMARY OF THE INVENTION

The present invention overcomes the foregoing and other drawbacks of the prior art and provides a novel and improved bearing chocking system for mill rolls which requires no modification of most existing mill roll necks or other associated parts, which eliminates the need for separate locking collars and threaded ring assemblies together with their expense and safety concerns, and which provides a vastly safer easily installed, adjusted, and removed bearing chock.

In accordance with the present invention, a novel bearing chocking assembly includes a segmented inner ring which is received in a standard annular groove in a conventional roll neck. An outer ring is provided which can be slipped over the inner ring segments and into engagement with a conventional bearing retainer. Wedge-shaped cam surfaces on the inner ring segments and the outer ring coact to axially move the outer ring as it is rotated relative to the inner ring, thereby axially adjusting the position of the bearing retainer and effecting chocking of the bearings. The inner ring is keyed to the roll neck to prevent relative rotation therebetween. The outer ring is bolted to the inner ring once the outer ring has been positioned to properly chock the roll bearings.

In one embodiment, the segmented inner ring includes two substantially identical semi-annular ring segments. Adjacent end regions of the segments are provided with locating holes to temporarily receive the pins of a locating tool. The locating tool is designed to hold the ring segments together in engagement with the roll neck groove while the outer ring is being installed or removed.

In another embodiment, the inner ring includes a pair of semi-annular segments which are hinged together. The hinged connection between the segments permits the segments to be installed over the roll neck and to extend into the groove, and also helps to retain the segments in position during installation and removal of the outer ring.

In both embodiments, the inner ring segments are keyed to the roll neck to prevent relative rotation therebetween when the outer ring is rotated relative to the inner ring. Threaded fasteners extending through aligned apertures in the inner and outer rings secure the inner and outer rings together once the outer ring has been positioned to properly chock the roll bearings.

A significant feature of the bearing chocking device of the present invention is its extremely simple construction. It uses no auxiliary locking ring which can fail and fall of the roll neck. It requires no extensive mating threaded connections to provide axial adjustability.

Another feature is the ease with which the improved bearing chocking device can be installed and removed. Once the threaded fasteners which connect the inner and outer rings together have been removed, disassembly involves nothing more than rotating the outer ring to a position where it is free to pass over the inner ring, whereafter the outer ring is removed and the inner ring segments are lifted off the roll neck. Reassembly reverses these steps. A specially configured wrench engageable with spaced notches around the periphery of the outer ring makes it easy to rotate the outer ring for proper bearing chocking.

Still another feature of the present invention is its inherent failure-free design which assures safe, reliable operation. The outer ring surrounds the inner ring segments preventing their moving out of the shaft groove. The outer ring cannot rotate relative to the inner ring segments so long as even one of the several threaded fasteners which secure these rings together remains intact.

In following from the foregoing discussion, it will be apparent that a principal object of this invention is to provide a novel and improved bearing chocking device.

Other objects and a fuller understanding of the invention may be had by referring to the following description and claims taken in conjunction with the accompanying drawings.

BRIEF DESCRIPTION OF THE DRAWINGS

FIG. 16 is a cross-sectional assembly view of another steel mill working roll together with a second bearing chocking assembly embodiment;

FIG. 17 is a front elevational view of the second bearing chocking assembly;

FIG. 20 is an enlarged view of the portion of the inner ring of FIG. 18;

FIG. 21 is a side elevational view of the structure shown in FIG. 22, as seen from the plane indicated by the line 21—21 in FIG. 18;

DESCRIPTION OF THE PREFERRED EMBODIMENT

Figure 1:
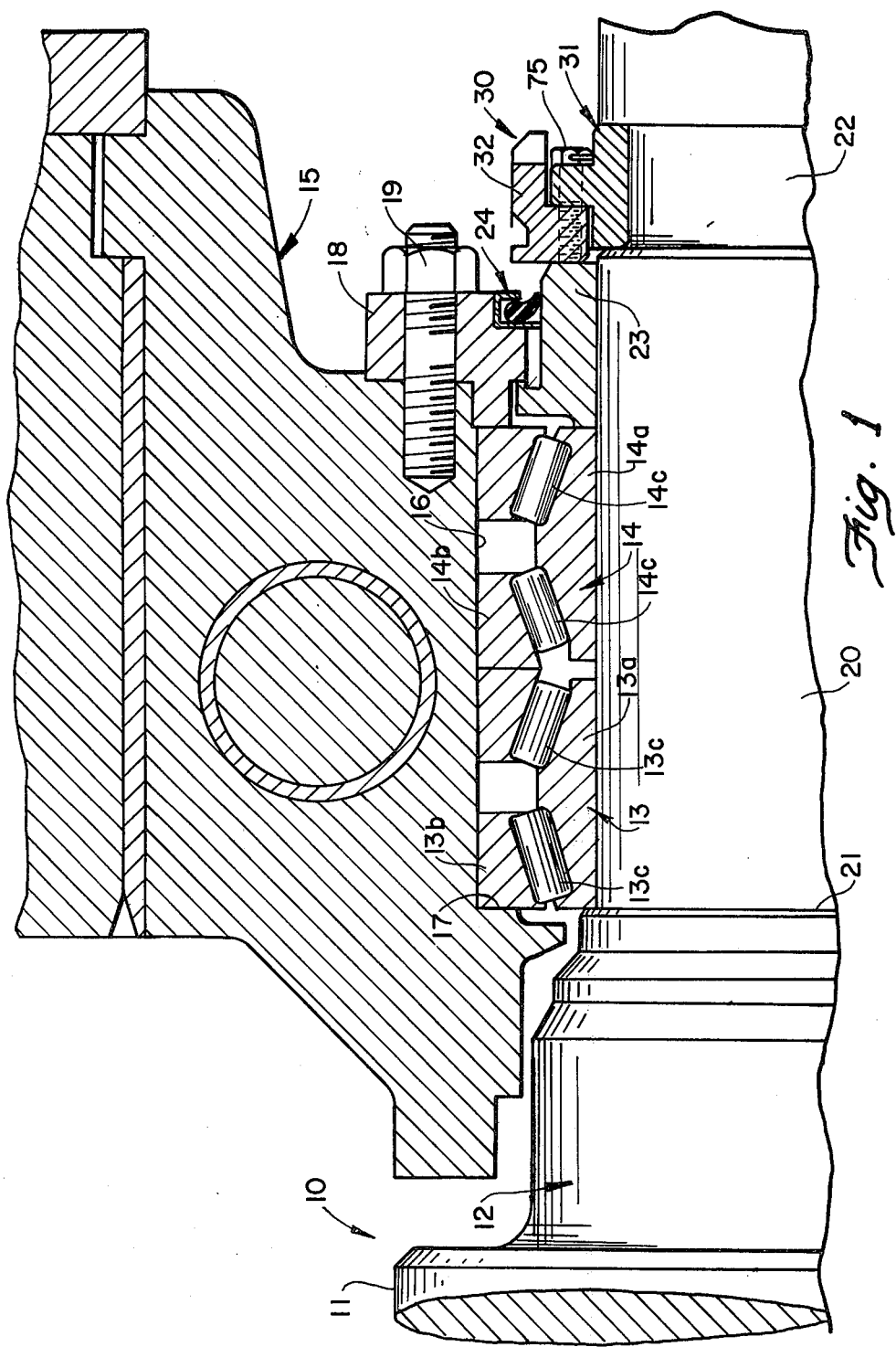
FIG. 1 is a sectional view showing a mill roll end region supported in the mill stand of a steel rolling mill.

Referring to FIG. 1, a mill roll of the type used in hot strip steel rolling mills is illustrated generally at 10. The roll 10 is of conventional configuration including a generally cylindrical central rolling surface 11 with identical reduced diameter necks formed on opposite end regions, one of which is shown at 12. Each of the roll necks is journaled for rotation by a pair of roller bearings 13, 14 supported in a conventional mill stand assembly, indicated generally by the numeral 15.

The bearings 13, 14 are positioned side-by-side and cooperate to support the mill roll 10. The bearings 13, 14 have inner races 13a, 14a and outer races 13b, 14b with rollers 13c, 14c interposed therebetween. A bore 16 terminated by a shoulder 17 is formed in the mill stand 15 and receives the outer races 13b, 14b. A clamping ring 18 secured by threaded fasteners 19 to the mill stand 15 engages the outer race 14b and clamps the bearings 13, 14 in side-by-side engagement with the outer race 13b contacting the shoulder 17.

A cylindrical supporting surface 20 is provided on the roll neck 12 between an annular shoulder 21 and an annular groove 22. The inner races 13a, 14a are located on the supporting surface 20 with the inner race 13a contacting the shoulder 21. A bearing retaining ring 23 is positioned on the supporting surface 20 between the inner race 14a and the groove 22. An oil seal 24 is interposed between the bearing retaining ring 23 and the clamping ring 18 to prevent the escape and contamination of bearing lubricant.

In accordance with the present invention, an improved bearing chocking assembly, indicated generally by the numeral 30, is provided for axially positioning the bearing retaining ring 23 to adjust the chocking of the bearings 13, 14. The chocking assembly 30 includes an inner ring assembly 31 positioned in the annular groove 22, and an outer ring 32 which bears against the retaining ring 23. As will be explained in greater detail, the inner and outer rings 31, 32 carry cooperating wedge-shaped cam formations which effect axial movement of the outer ring 32 relative to the inner ring 31 when the outer ring is rotated relative to the inner ring. Bearing chocking is adjusted by turning the outer ring 32 until the bearings are clamped tightly between the shoulder 21 and the retaining ring 23, whereafter the outer ring 32 is loosened to give the bearings 13, 14 proper freedom of movement.

Figure 2:
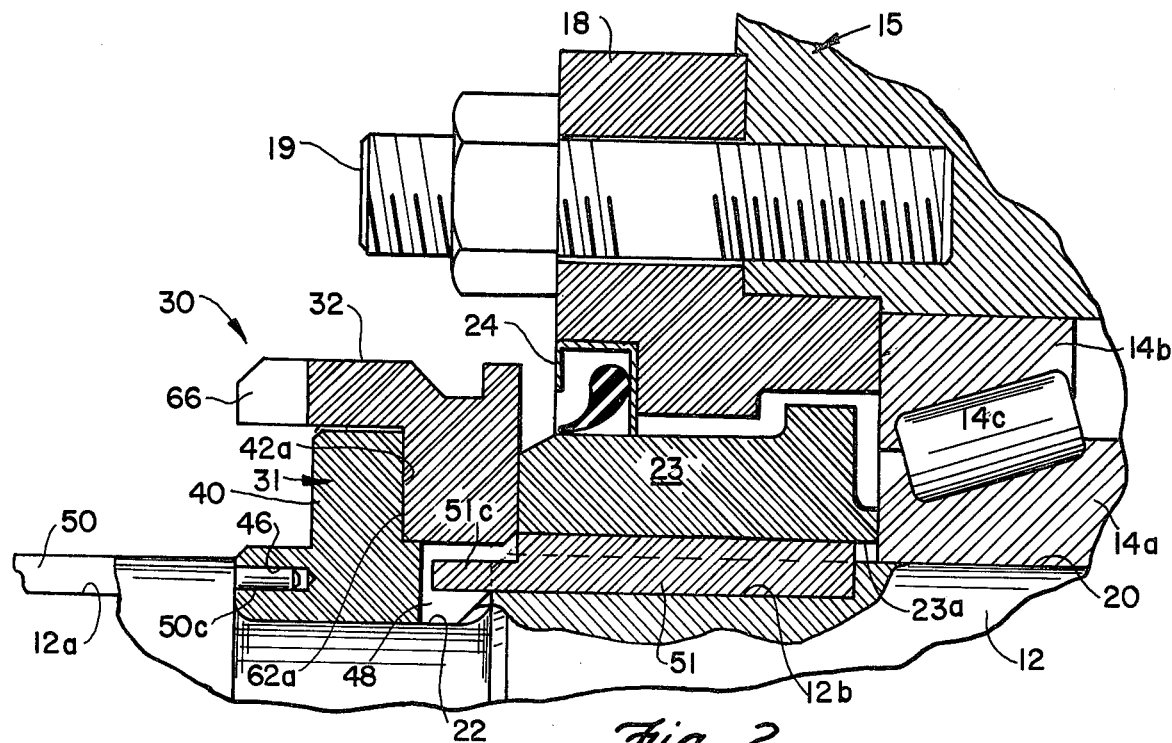
FIG. 2 is an enlarged sectional view similar to FIG. 1, showing another portion of the mill roll of FIG. 1 together with a novel bearing chocking assembly.

Keyways are formed on opposite sides of the roll necks 12, as illustrated at 12a, 12b in FIG. 2. As will be explained in greater detail, a specially configured locating tool 50 is positioned in the keyway 12a during installation of the bearing chocking assembly 30 to hold segments of the inner ring assembly 31 in place. A specially configured retaining key 51 is positioned in the keyway 12b and extends into a notch in the inner ring assembly 31 and the roll 10. A mating keyway 23a formed in the retaining ring 23 receives portions of the key 51 to establish a driving connection between the retaining ring 23 and the roll 10.

Figure 10:
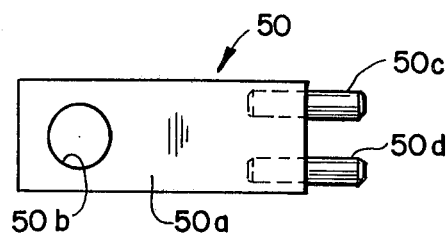
FIGS. 10 and 11 are top plan and side elevational views, respectively of a locating tool used to temporarily retain the inner ring segments in place during installation of the outer ring.
Figure 11:
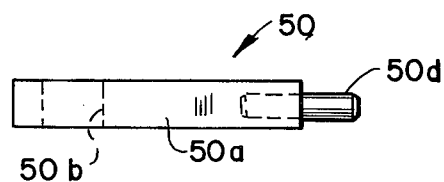

Referring to FIGS. 10 and 11, the locating tool 50 includes a bar-shaped handle 50a of generally rectangular cross section. A gripping aperture 50b is formed through one end region of the handle 50a. The opposite end region is apertured to rigidly mount two spaced parallel extending locating pins 50c, 50d.

Figure 12:
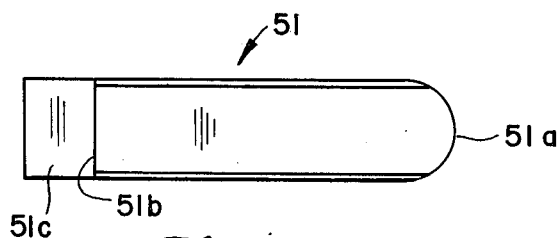
FIGS. 12 and 13 are top plan and side elevational views of a retaining key.
Figure 13:
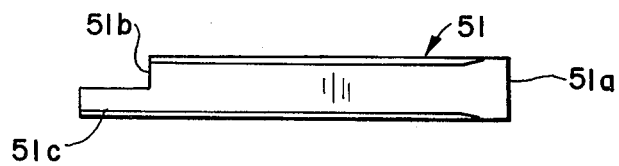

Referring to FIGS. 12 and 13, the retaining key 51 comprises a bar of generally rectangular cross section. One end region of the key 51 is rounded at 51a. The other end region is notched at 51b to define a projection 51c of reduced rectangular cross section.

Figure 5:
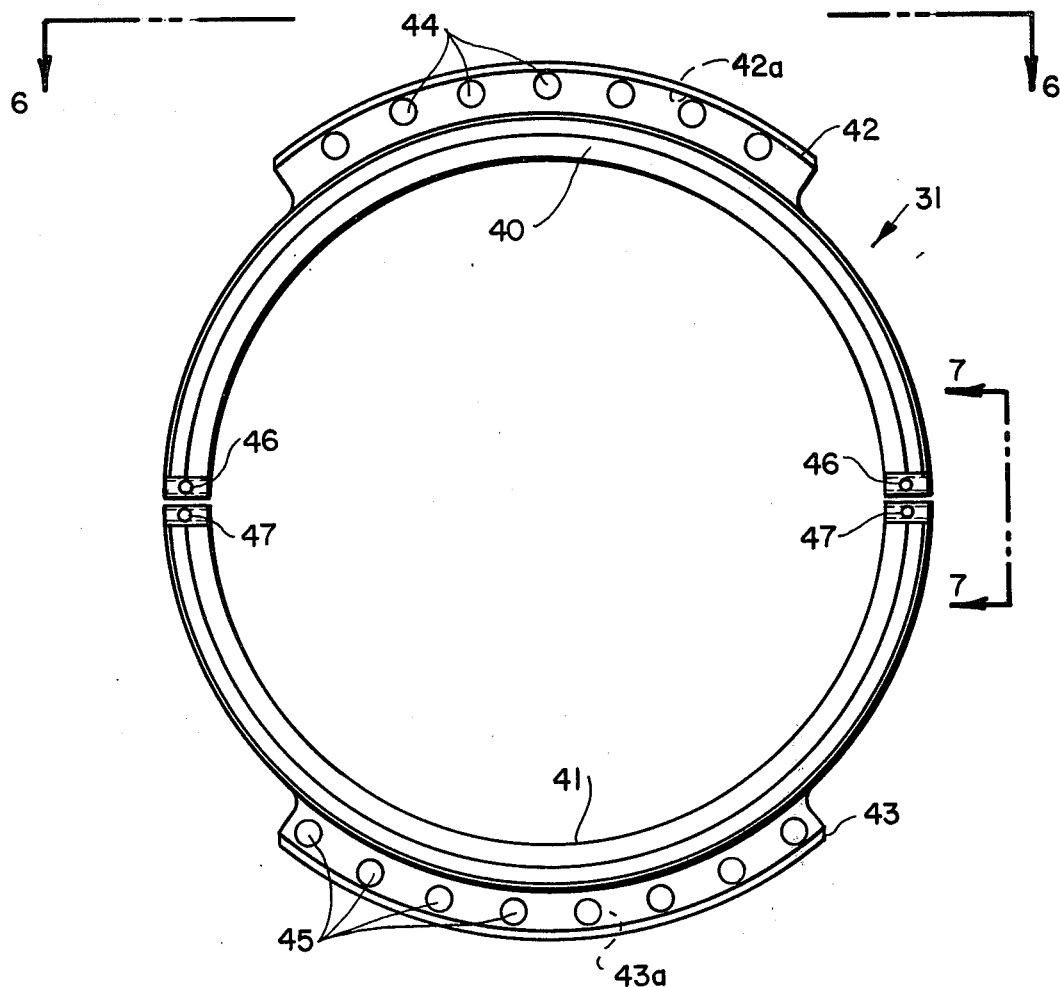
FIG. 5 is a front elevational view of the inner locking ring of the bearing chocking assembly.
Figure 6:
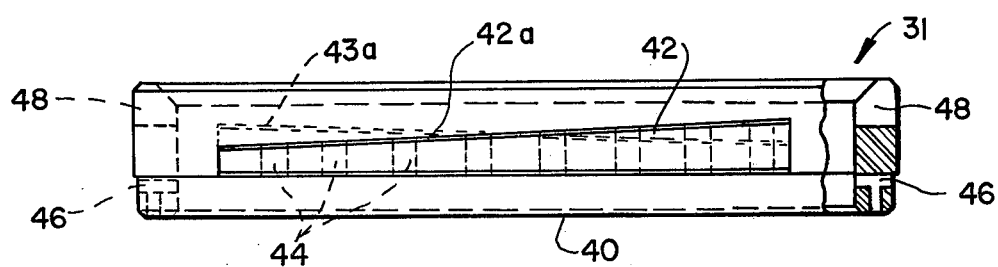
FIG. 6 is a top plan view as seen from the plane indicated by the line 6—6 in FIG. 5.

The construction of the inner ring assembly 31 is illustrated in FIGS. 5 and 6. Two identical semi-annular segments 40, 41 are provided with radially outwardly extending flanges 42, 43. The flanges 42, 43 are of wedge-shaped configuration, as best seen in FIG. 6. Cam surfaces 42a, 43a are formed on the back sides of the flanges 42, 43. Apertures 44, 45 are formed through the flanges 42, 43.

Figure 7:
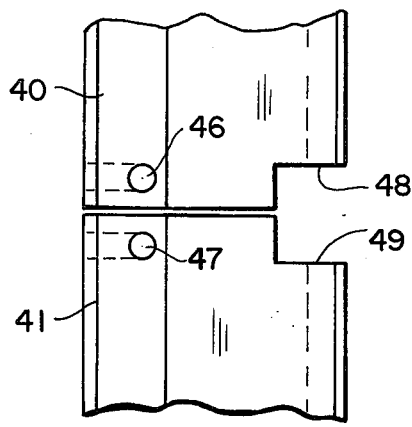
FIG. 7 is an enlarged side elevational view of a portion of the inner ring as seen from the plane indicated by the line 7—7 in FIG. 5.

Referring to FIG. 2 in conjunction with FIGS. 5–7, end regions of the inner ring segments 40, 41 are adapted to receive the locating tool 50 and the retaining key 51. The end regions of the segments 40, 41 are drilled to provide locating holes 46, 47 adapted to receive the locating pins 50c, 50d. As is best seen in FIGS. 6 and 7, the locating holes 46, 47 are of T-shape, defining a port 46a, 47a of entry into which the locating pins 50c, 50d can be inserted and two relief ports 46b, 47b to prevent accumulation of foreign matter in the chamber defined by port 46a, 47a. The end regions of the segments 40, 41 are also notched at 48, 49 to receive the retaining key end projection 51c.

Figure 3:
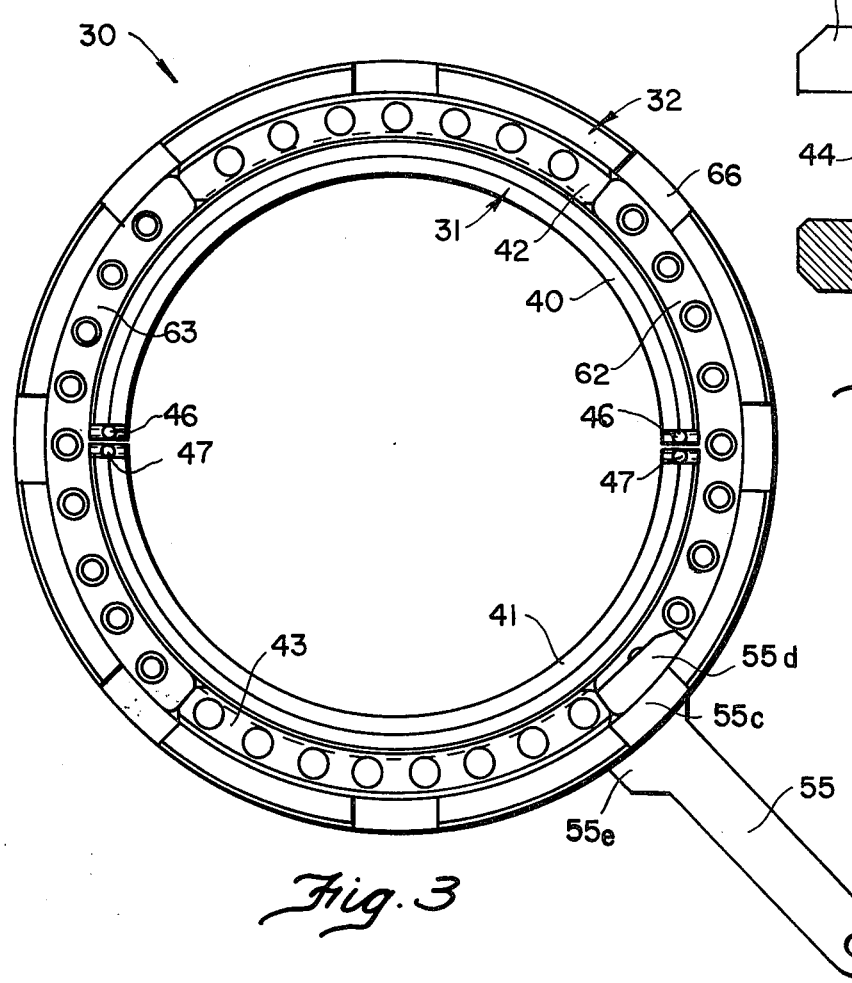
FIG. 3 is a front elevational view of the bearing chocking assembly during installation immediately after the outer ring of the bearing chocking assembly has passed over the inner ring thereof.
Figure 8:
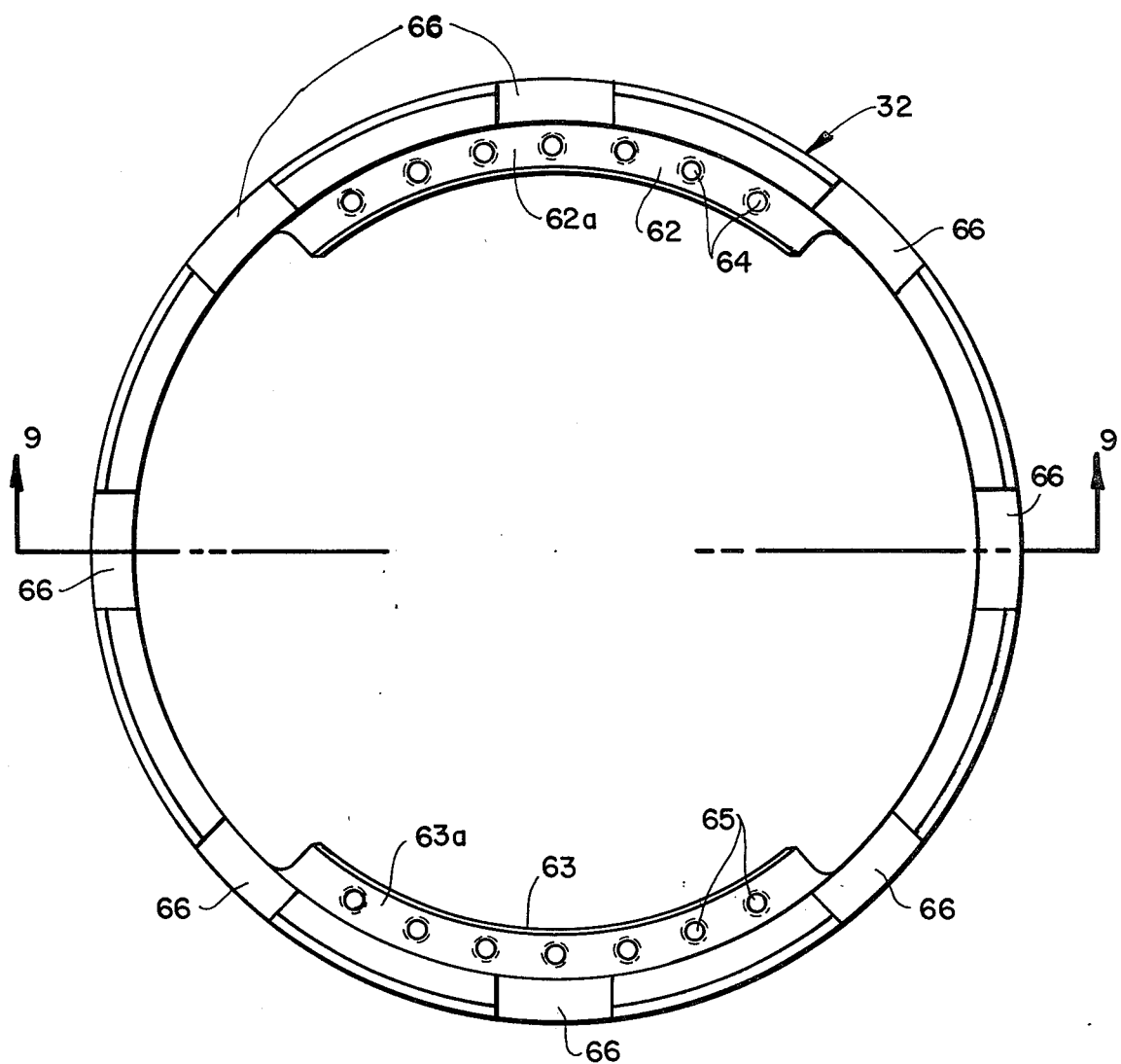
FIG. 8 is a front elevational view of the outer ring of the bearing chocking assembly.
Figure 9:
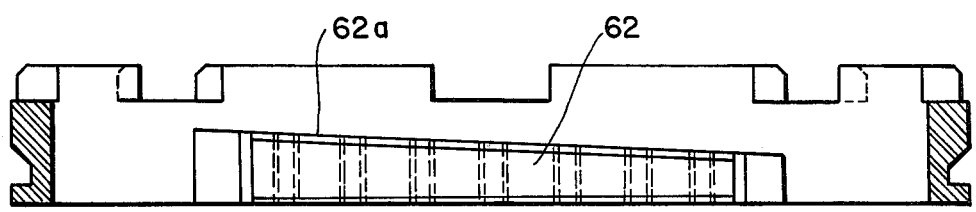
FIG. 9 is a cross-sectional view as seen from the plane indicated by the line 9—9 in FIG. 8.

The construction of the outer ring 32 is illustrated in FIGS. 8 and 9. Two radially inwardly extending flanges 62, 63 of wedge-shaped configuration define cam surfaces 62a, 63a on their front sides. Threaded apertures 64, 65 are formed through the flanges 62, 63. Notches 66 formed at 45° spacings around the periphery of the outer ring 32 are adpated to receive a special wrench 55, as shown in FIG. 3, to tighten and loosen the chocking of the bearings 13, 14.

Figure 14:
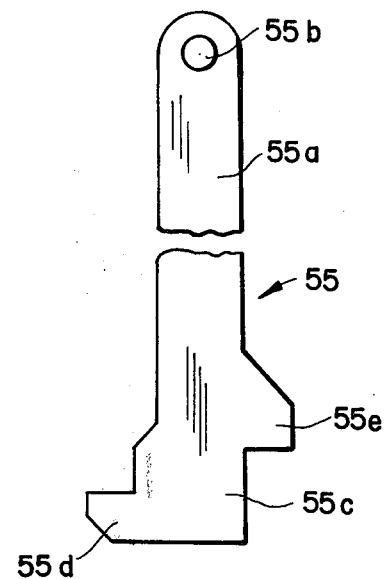
FIG. 14 is a side elevational view of a special wrench for rotating the outer ring relative to the inner ring.

Referring to FIG. 14, the wrench 55 includes a bar-shaped handle 55a of generally rectangular cross section drilled at one end to provide a gripping aperture 55b. The opposite end region has an enlarged neck 55c adapted to be received in the notches 66. Opposed projections 55d, 55e are provided to grip portions of the outer ring adjacent the notches 66, as shown in FIG. 3.

Installation of the bearing chocking assembly 30 on the roll neck 12 is quite simple. The inner ring segments 40, 41 are positioned in place in the annular groove 22 with the notches 48, 49 receiving the retaining key end projections 51c. The locating tools 50 are then positioned in the keyways 12a with the locating pins 50c, 50d extending into the locating holes 46, 47, as shown in FIG. 2. The locating tools 50 serve to retain the inner ring segments 40, 41 in place until the outer ring 32 is brought into position. The outer ring is slipped over the inner ring segments with the inwardly extending flanges 62, 63 positioned between the outwardly extending flanges 42, 43, as shown in FIG. 3.

Figure 4:
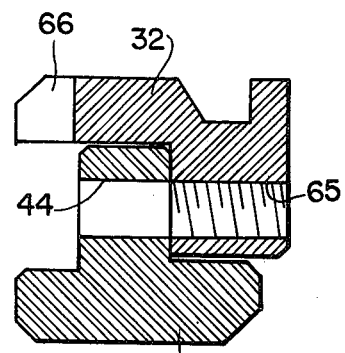
FIG. 4 is a sectional view of the inner and outer rings assembled in a bearing chocking position prior to their being secured together by threaded fasteners.
Figure 15:
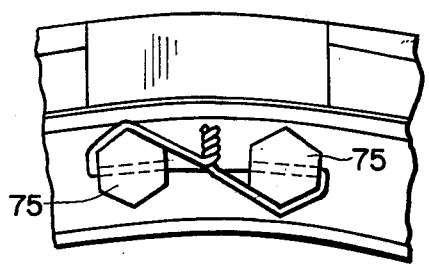
FIG. 15 is an enlarged side elevational view of a portion of the bearing chocking assembly illustrating the wire-tired threaded fasteners which secure the inner and outer rings together.
Figure 18:
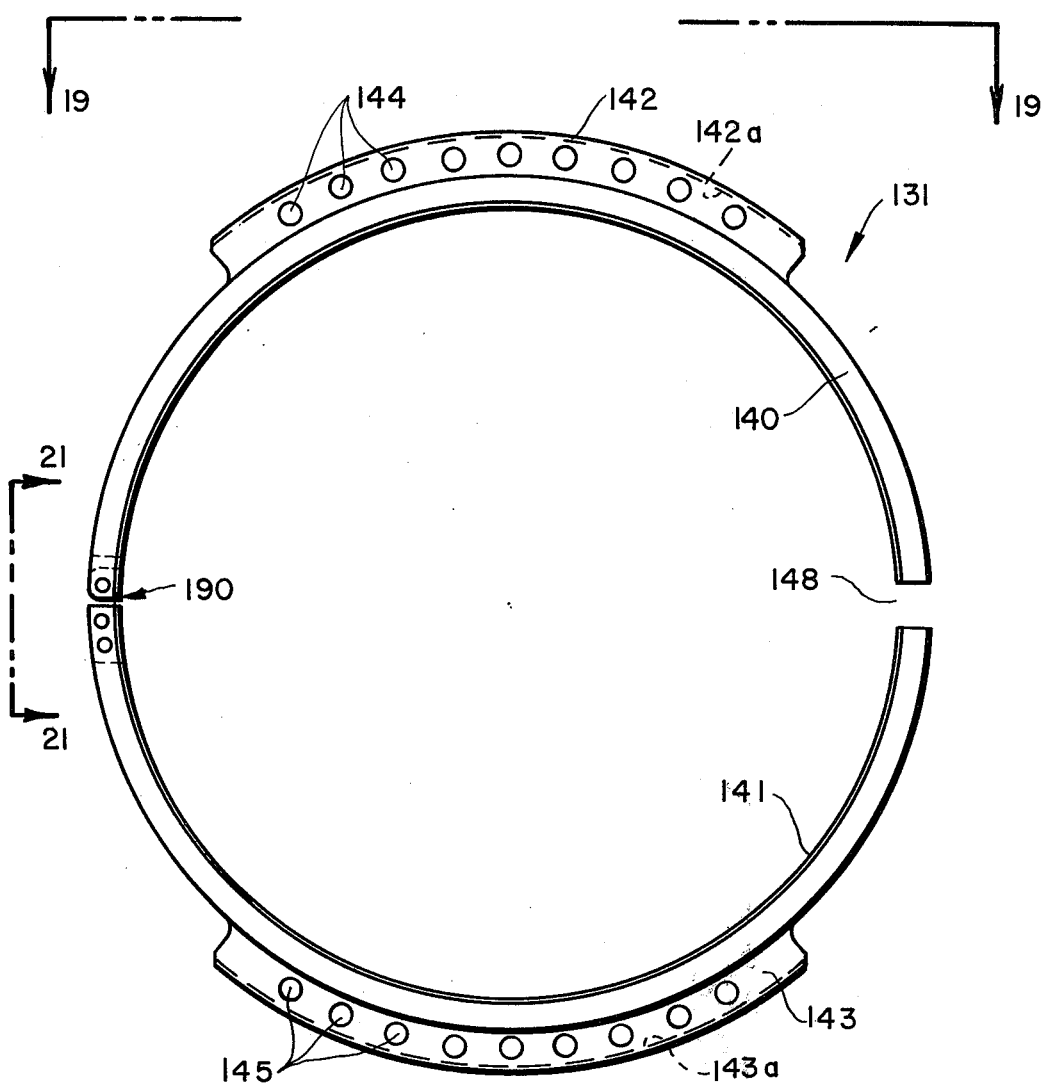
FIG. 18 is an enlarged front elevational view of the inner ring of the second bearing chocking assembly.

Once the outer ring flanges 62, 63 have passed inwardly of the inner ring flanges 42, 43 the wrench 55 is positioned in one of the notches 66 and the outer ring is rotated to bring the cam surfaces 42a, 62a and 43a, 63a into engagement as shown in FIG. 2. Rotation of the outer ring is continued until the bearing retainer ring 23 firmly clamps the bearings 13, 14 against the shoulder 21. The outer ring is then backed-off a predetermined distance, typically about 15°, to provide a proper freedom of movement for the bearings 13, 14. The inner and outer ring apertures 44, 64 and 45, 64 are then aligned, as shown in FIG. 4, to receive threaded fasteners 75 as shown in FIG. 1. Once the fasteners 75 have been tightened in place, they are wired as shown in FIG. 15 to prevent their subsequent loosening. The locating tool 50 and the wrench 55 are then removed from the inner and outer rings 31, 32 and stored for subsequent use.

Removal of the bearing chocking assembly 30 is accomplished simply by reversing the described installation steps.

The foregoing description is directed to mill rolls of the type commonly used in steel hot strip rolling mills. The bearing chocking assembly of the present invention is, by no means, limited to use on hot strip mills, as will now be illustrated in conjunction with a plate rolling mill installation utilizing a slightly modified embodiment of the bearing chocking assembly.

Referring to FIG. 16, a mill roll of the type used in steel plate rolling mills is illustrated generally at 110. The roll 110 has a reduced diameter neck 112 supported by bearings (not shown) in a mill stand 115. The neck 112 is provided with a keyway 112b, and has an annular groove 122. A bearing retaining ring 123 is positioned on the roll neck 112 and has a keyway 123a overlying the roll neck. A retaining key 151 positioned in the keyways 112b, 123a establishes a driving connection between the roll 110 and the retaining ring 123. The retaining key 151 has a reduced cross section end projection 151c extending across the annular groove 122.

A bearing chocking assembly 130 is provided including an inner ring assembly 131 positioned in the annular groove 122, and an outer ring 132 engaging the retaining ring 123. The chocking assembly embodiment 130 differs from the above-described chocking assembly 30 in three respects: (1) the segments of the inner ring assembly 131 are hinged together to obviate the need for a locating tool during installation; (2) the locking bolts used to prevent relative rotation between the inner and outer rings extend completely through the outer ring and are threaded into apertures in the retaining ring 123 rather than into apertures in the outer ring; and (3) only one retaining key is employed to key the inner ring to the roll neck.

Figure 19:
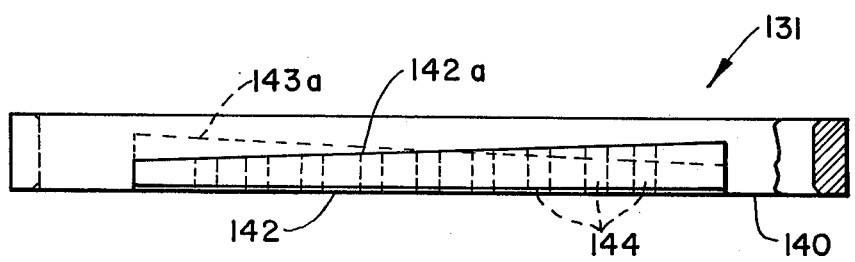
FIG. 19 is a top plan view as seen from the plane indicated by the line 19—19 in FIG. 18.

The construction of the inner ring assembly 131 is shown in FIGS. 18–21. A pair of semi-arcuate segments 140, 141 are provided with radially outwardly extending flanges 142, 143. The flanges 142, 143 are of wedge-shaped configuration, as best seen in FIG. 19. Cam surfaces 142a, 143a are formed on the back sides of the flanges 142, 143. Apertures 144, 145 are formed through the flanges 142, 143.

A hinge assembly 190 is provided to pivotally connect adjacent end regions of the rings 140, 141. As best seen in FIGS. 20, 21 the hinged end regions of the segments 140, 141 are notched at 192, 193 respectively to receive a hinge bar 194. A pair of roll pins 195 driven into aligned through apertures in the ring segment 141 and the hinge bar 194 rigidly couple the hinge bar 194 to the ring segment 141. A single roll pin 196 positioned in aligned apertures in the ring segment 140 and the hinge bar 194 pivotally connect the hinge bar 194 to the ring segment 140. By this arrangement, the ring segments 140, 141 can pivot relative to each other for installation over the end of the mill roll 110 and into the annular groove 122. The opposite ends of the inner ring segments 140, 141 terminate in spaced relationship with each other to define a gap 148 of such width as will receive the retaining key end projection 151c when the inner ring assembly 13 is positioned in the annular groove 122.

Figure 22:
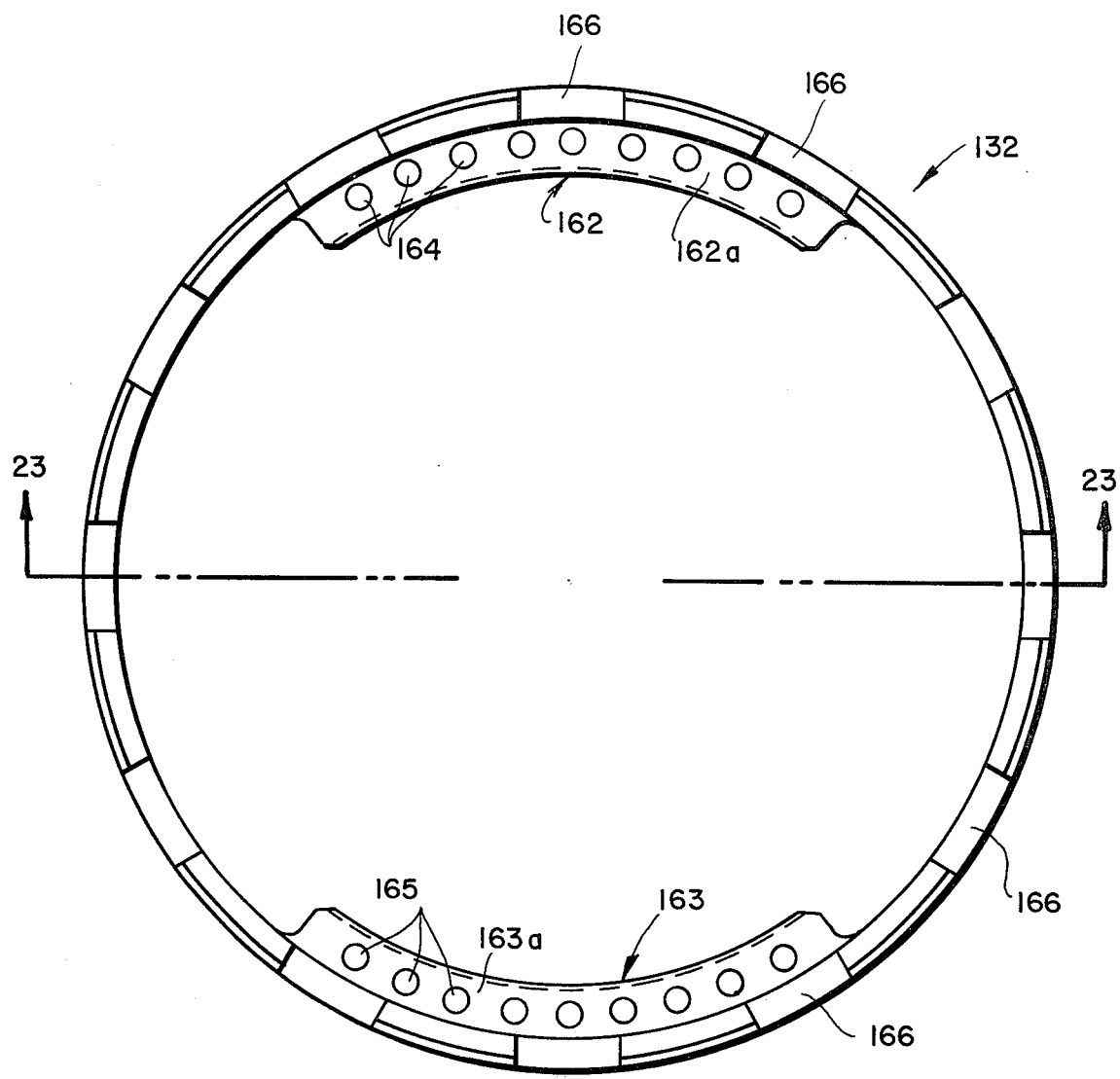
FIG. 22 is a front elevational view of the outer ring of the second bearing chocking assembly; and, FIG. 23 is a cross-sectional view as seen from the plane indicated by the line 23—23 in FIG. 22.
Figure 23:
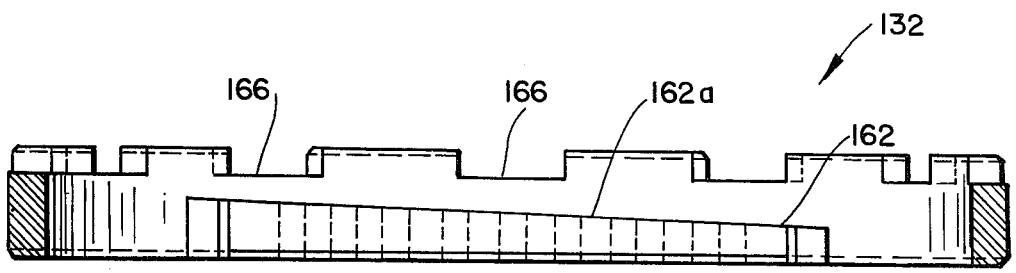

The construction of the outer ring 132 is illustrated in FIGS. 22, 23. Two radially inwardly extending flanges 162, 163 of wedge-shaped configuration define cam surfaces 162a, 163a on their front sides. Apertures 164, 165 are formed through the flanges 162, 163. Notches 166 formed at spaced intervals around the periphery of the outer ring 132 are adapted to receive the ring rotating wrench 55.

Installation of the bearing chocking assembly 130 on the roll neck 112 is identical to that described in conjunction with the bearing chocking embodiment 30, with two minor exceptions. First, in positioning the inner ring segments, the ring gap 148 is aligned in mating relationship with the retaining key end projection 151c and no locating tool is needed to keep the inner ring segments in position. Secondly, the ring locking fasteners 175 extend through aligned apertures 144, 165 in the inner and outer rings 131, 132 and into threaded apertures 199 formed in the retaining ring 123. By this arrangement, the threaded fasteners assist the key 151 in establishing a driving connection between the roll neck 112 and the bearing chocking assembly 130.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. A bearing chocking device positionable on a shaft in engagement with a groove extending around the shaft for chocking a bearing structure which journals the shaft at a location spaced axially from the groove, comprising:
   a. a first ring structure including a plurality of arcuate ring segments engageable with the shaft groove and defining first cam surfaces;
   b. a second ring structure having second cam surfaces engageable with said first cam surfaces to effect axial movement of said second ring structure toward and away from the bearing structure as said second ring structure is rotated relative to said first ring structure;
   c. retaining means establishing a connection between said first ring structure and the shaft to prevent rotation of said first ring structure relative to the shaft when said second ring structure is rotated relative to said first ring structure; and
   d. connection means for securing said ring structures together once said second ring structure has been positioned to properly chock the bearing structure.

2. The bearing chocking device of claim 1 wherein said ring structures are configured to permit said second ring structure to pass axially over said first ring structure during assembly and disassembly of the bearing chocking device while said first ring structure is in engagement with the shaft groove.

3. The bearing chocking device of claim 1 wherein:
   a. each of said ring segments is provided with radially outwardly extending flange portions which define said first cam surfaces;
   b. said second ring structure is provided with radially inwardly extending flange portions which define said second cam surfaces; and
   c. said inwardly and outwardly extending flange portions are configured to permit said inwardly extending flange portions to pass between said outwardly extending flange portions when said ring segments are in engagement with the shaft groove, thereby permitting said second ring structure to be passed axially over said first ring structure during assembly and disassembly of the bearing chocking device.

4. The bearing chocking device of claim 1 wherein said ring segments are pivotally interconnected to facilitate their positioning on the shaft in the shaft groove.

5. The bearing chocking device of claim 1 wherein adjacent ends of said ring segments are provided with locating apertures, and a locating tool carrying pin-shaped projections engageable with said locating apertures is provided to assist in retaining said ring segments in position in engagement with the shaft groove during installation and removal of said second ring structure.

6. In a bearing shaft connection of the type including (1) a shaft having a groove extending therearound, (2) a bearing structure journaling the shaft at a location spaced axially from the shaft groove, and (3) a bearing retaining ring positioned on the shaft in engagement with the bearing structure and extending axially toward the shaft groove, the improvement of a bearing chocking device engageable with the shaft groove for axially positioning the retaining ring to chock the bearing structure, comprising:
   a. a plurality of arcuate ring segments engageable with the shaft groove, each of said segments having first cam surface portions formed integrally therewith;
   b. a ring structure having second cam surface portions formed integrally therewith and being engageable with said first cam surface portions to effect axial movement of said ring structure toward and away from the bearing retaining ring as said ring structure is rotated relative to said ring segments; and
   c. fastening means for establishing a driving connection among the shaft, the bearing retaining ring, said ring segments and said ring structure, including first fastening means for preventing rotation of said ring segments relative to the shaft when said ring structure is rotated relative to said ring segments during assembly and disassembly of the bearing chocking device, and second fastening means for preventing relative rotation between said ring structure and said ring segments once said ring structure has been positioned to properly chock the bearing structure.

7. The apparatus of claim 6 wherein said first fastening means includes at least one key positioned in a keyway in the shaft and having key portions extending into engagement with at least one of said ring segments.

8. The apparatus of claim 6 wherein said second fastening means includes threaded fastening means extending through aligned openings in said ring structure and said ring segments.

9. The apparatus of claim 6 wherein:
   a. said first fastening means includes at least one key positioned in a keyway in the shaft and having key portions extending into driving engagement with said ring segments and with the bearing retaining ring; and b. said second fastening means includes threaded fastening means extending through aligned openings in said ring structure and said ring segments.

10. The apparatus of claim 6 wherein said ring segments are pivotally connected together to facilitate positioning over the shaft and into engagement with the shaft groove during assembly of the bearing chocking device.

11. The apparatus of claim 6 wherein said ring segments and said ring structure are configured to permit said ring structure to pass axially over said ring segments during assembly and disassembly of the bearing chocking device while said ring segments are in engagement with the shaft groove.

12. The apparatus of claim 6 wherein:
a. each of said ring segments is provided with radially outwardly extending flange portions which define said first cam surface portions;
b. said ring structure is provided with a plurality of spaced radially inwardly extending flange portions which define said second cam surface portions; and
c. said inwardly and outwardly extending flange portions are configured to permit said inwardly extending flange portions to pass between said outwardly extending flange portions when said ring segments are in engagement with the shaft groove, thereby permitting said ring structure to be passed axially over said ring segments during assembly and disassembly of the bearing chocking device.

13. A bearing chocking device positionable on a shaft in engagement with a groove extending around the shaft for chocking a bearing structure which journals the shaft at a location spaced axially from the groove, comprising:
a. a pair of semi-annular ring segments positionable in end-to-end relationship in engagement with the shaft groove to define a first ring structure connected to the shaft and restrained from moving axially therealong;
b. a second ring structure configured to permit its axial movement along the shaft over said ring segments when said ring segments are in position in engagement with the shaft groove;
c. coacting cam means formed on said ring segments and said second ring structure for effecting axial movement of said second ring structure toward and away from the bearing structure when said second ring structure is rotated relative to said ring segments after having been installed over said ring segments and having portions positioned between said ring segments and the bearing structure; and,
d. fastener means for securing said second ring structure to said ring segments once said second ring structure has been positioned to effect proper chocking of the bearing structure.

14. The apparatus of claim 13 wherein at least one keyway is formed in the shaft in the vicinity of the shaft groove, at least one key is positioned in said keyway and has key portions extending into engagement with at least one of said ring segments for preventing relative rotation between said ring segments and the shaft when said second ring structure is rotated relative to said ring segments.

15. The apparatus of claim 14 wherein a bearing retaining ring is interposed between said second ring structure and the bearing structure, and said key has additional key portions extending into engagement with said retaining ring to establish a driving connection between the shaft and said retaining ring.

16. The apparatus of claim 15 wherein said ring segments are pivotally connected together at one end region of each segment, and the other end regions of each segment are adapted to receive said key portions when said ring segments are positioned on the shaft in engagement with the shaft groove.

17. The apparatus of claim 15 wherein two keys are provided in keyways on opposite sides of the shaft and adjacent end regions of said ring segments are adapted to receive portions of said keys.

18. In a bearinged shaft connection formed between the reduced diameter end region of a mill roll neck and a supporting mill stand wherein the roll neck is provided with an annular groove, a bearing structure supported in the mill stand journals the shaft for rotation at a position spaced axially from the shaft groove, and a bearing retaining ring is interposed between the shaft groove and the bearing structure, the improvement of a bearing chocking device engageable with the shaft groove for axially positioning the retaining ring to chock the bearing structure, comprising:
a. a segmented inner ring with the segments thereof each being adapted to engage the annular groove formed in the roll neck and having portions defining interrupted wedge surfaces which extend partially circumferentially around the inner ring;
b. an outer ring configured to permit its passage axially over said inner ring when said inner ring is positioned in place on the roll neck, and having portions defining interrupted wedge formations extending partially circumferentially around the outer ring;
c. said wedge surfaces and formations being engageable with each other once said outer ring has been positioned over said inner ring whereby relative rotation between said rings will effect corresponding axial movement of said outer ring along said roll neck to axially position the retaining ring; and
d. fastener means for securing said inner ring segments to said outer ring once the desired axial positioning of said outer ring has been effected.

19. The apparatus of claim 18 wherein said ring segments are pivotally interconnected to facilitate their positioning on the shaft in the shaft groove.

20. The apparatus of claim 18 wherein adjacent ends of said ring segments are provided with locating apertures, and a locating tool carrying pin-shaped projections engageable with said locating apertures is provided to assist in retaining said ring segments in position in engagement with the shaft groove during installation and removal of said outer ring structure.

21. The bearing chocking device of claim 18 wherein said outer ring structure is provided with a plurality of circumferentially spaced wrench-engaging formations around the periphery thereof, and wrench means is provided for engaging said spaced formations to facilitate rotating said outer ring structure during assembly and disassembly of the bearing chocking device.

* * * * *